July 18, 1961        J. E. GRAY        2,992,507

SEPARABLE FISHING HOOK ASSEMBLY

Filed Dec. 24, 1958

INVENTOR.
JACOB E. GRAY
BY   *A. H. Edgerton*
WATTS & EDGERTON

ATTORNEYS

United States Patent Office 2,992,507
Patented July 18, 1961

2,992,507
SEPARABLE FISHING HOOK ASSEMBLY
Jacob E. Gray, 123 W. Northview Ave., New Castle, Pa.
Filed Dec. 24, 1958, Ser. No. 782,864
2 Claims. (Cl. 43—42.09)

This invention relates broadly to fish hooks and more specifically to the combination of a fish hook, without an eyelet in the end thereof, a fish line coupling therefor and a separable fly for said coupling.

In hooks of the conventional form, i.e. hooks with an eyelet in the end of the shank for attachment of the line or snell, appreciable difficulty is encountered in removing the hook from the fish since the barbed end thereof must necessarily be torn or cut from the mouth or body of the fish. This difficulty is eliminated in the present invention through the provision of a hook that may be readily separated from the line and removed from the fish by withdrawal of the straight shank thereof.

The invention is a continuation in part of my copending application filed September 22, 1958, Serial No. 762,-527 (now abandoned), entitled "Separable Fishing Hook Assembly."

One of the objects of the invention is to provide an arcuate tubular sleeve for attachment of a line to a hook having a straight shank with a key on the end thereof that may be readily inserted in the sleeve then revolved to effect the engagement of the key with a keeper in the sleeve.

Another object of the invention is to provide a stop in the tubular sleeve to delimit the movement of the shank of the fish hook when inserted therein.

A further object of the invention is to undercut the opposed sides of the shank of the fish hook subjacent the key to facilitate the ready entry of the key within a notch in the sleeve that constitutes a keeper.

Another object of the invention is to provide a fly comprising a collar having feathers or a similar artifice thereon, which is proportioned for telescopic engagement with the coupling sleeve.

Further objects of the invention reside in an improved fish hook, fly and coupling assembly which is economic of manufacture, efficient of operation, and constructed to facilitate the release of the hook from the coupling, the release of the hook from the fish, and the release of the fly from the coupling with ease and dispatch.

Referring to the drawings.

Figure 3:
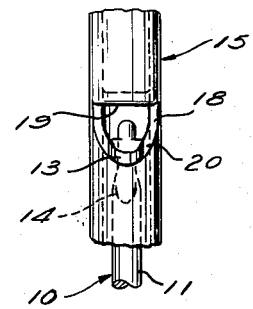
FIG. 3 is an enlarged front elevational view of a fragmentary portion of the sleeve illustrating the notch therein and the key in its engaged position.
Figure 1:
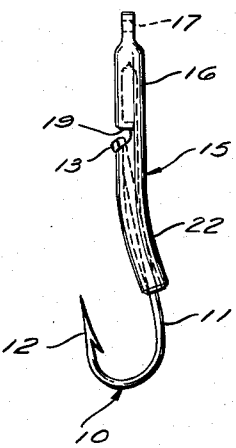
FIG. 1 is a side elevational view of the improved hook and sleeve assembly.

Referring first to FIG. 1 the hook 10 comprises a straight stem or shank 11 having a barb 12 on the curved end thereof and a key 13 on its opposed end in confronting relation with the barb 12. The body of the shank subjacent the key is formed with a flat land 14 facing the barb and each side of the body of the shank 11 below the key is relieved to accommodate the free entry and revolution of the key.

The coupling sleeve comprises a tubular sleeve 15 of arcuate form with a straight upper portion 16 which is formed with an eye 17 therein for attachment of a fish line or snell. The sleeves are preferably made of aluminum which may be anodized if desired.

Figure 2:
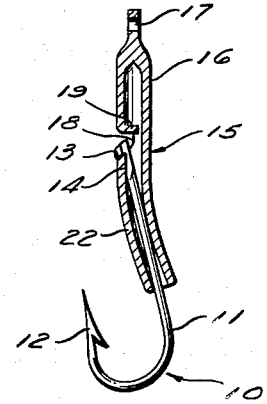
FIG. 2 is a longitudinal sectional view of the hook and coupling sleeve illustrating the interengagement of the key on the end of the shank with a lip that constitutes a keeper.
Figure 4:
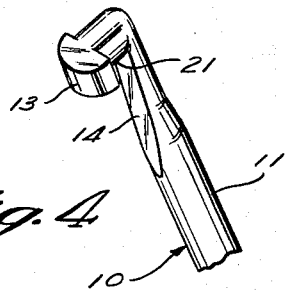
FIG. 4 is a view in perspective of the upper portion of the key on the shank of the hook.
Figure 6:
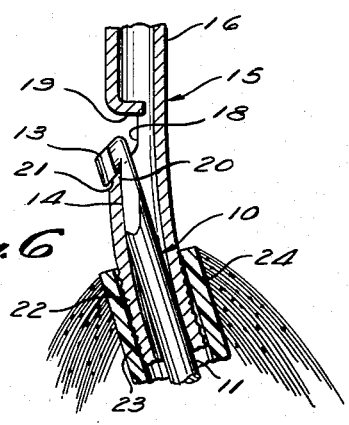
FIG. 6 is a side elevational view of the fly shown on an enlarged scale and further illustrating the form of the key on the end of the hook.

The upper portion of the sleeve is formed with a notch 18, the upper edge 19 thereof being bent inwardly transaxial the tubular sleeve and the lower edge or shoulder 20 being inclined downwardly. The bent face of the tube constituting the edge 19 provides an abutment to delimit inward movement of the shank of the hook and to deflect the key 13 into the notch 18. The key is bent downwardly to form a hook 21 in the lower face thereof (FIGS. 4 and 6) and the rearward face of the upper end thereof is of arcuate form. The straight shank 11, when inserted in the arcuate portion 22 of the sleeve, is sprung slightly so the keyed end thereof will snap into the notch 18 and the inclined face 21 thereof will engage the edge 20 which constitutes a keeper. The inherent spring tension of the hook effected by the arcuate sleeve forces the land 14 against the inner wall of the tube adjacent the keeper, and the rearward face of the shank against the opposed inner wall of the arcuate tube (FIGS. 2 and 6).

Figure 5:
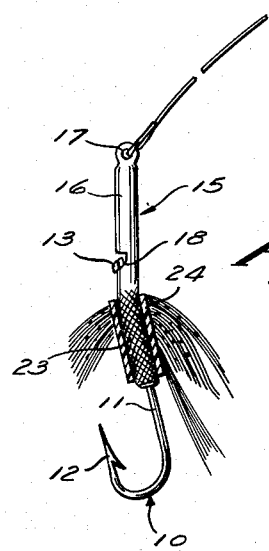
FIG. 5 is a sectional view of the coupling, sleeve and a collar that supports the fly feathers.

The lower end of the coupling sleeve 15 is formed with tool markings or serrations 23 (FIG. 5) for the frictional support of collars 24 which are telescopically engaged therewith when the hook assembly is used for fly casting. The collars 24 are preferably made of plastic and the outer face of the collars have a cluster of small feathers or other bright and attractive artifices affixed thereon to form a fly.

If a fish is not attracted by a fly of a particular form or color the hook 10 may be removed from the coupling and another collar 24 with other plumage thereon may be substituted therefor, then the hook may be reassembled. Obviously a collar having a spoon or bright spangle linked thereto may be used in place of the feathered fly if the fisherman so desires.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A fish hook assembly comprising a hollow sleeve having an open end, a closed end provided with an eyelet for a fish line and a notch in one side between said ends, said notch defining a shoulder, said shoulder being inclined toward said closed end, the sleeve being bent laterally toward the side opposite said notched side and between the open end and the notch, and a spring steel hook having a straight shank and a key projecting laterally from the free end of the shank, the diameters of the shank, and the tubular space within the sleeve and the extent of bend of the sleeve being such that when the shank is inserted in the open end of the sleeve and moved lengthwise thereof the key at the end of the shank will be forced outwardly into the notch and will be maintained in holding engagement with the shoulder in the sleeve, the hook being removable by rotating it in the sleeve sufficiently to disengage the key from the notch and shoulder.

2. A fish hook assembly comprising a hollow sleeve having an open end, a closed end provided with an eyelet for a fish line and a notch in one side between said ends, said notch defining a shoulder, said shoulder being inclined toward said closed end, the sleeve being bent laterally toward the side opposite said notched side and between the open end and the notch, and a spring steel hook having a straight shank and a key projecting laterally from the free end of the shank, the diameters of the shank and the tubular space within the sleeve and the extent of bend of the sleeve being such that when the shank is inserted in the open end of the sleeve and moved lengthwise thereof the key at the end of the shank will be forced outwardly into, and will be maintained in, holding engagement with the notch in the sleeve, and a collar telescopically and removably positioned on the open end of the sleeve and a fly affixed to the collar.

References Cited in the file of this patent

UNITED STATES PATENTS

| | | |
|---|---|---|
| 633,797 | Cantrell | Sept. 26, 1899 |
| 1,055,104 | Van Norsdall | Mar. 4, 1913 |
| 2,884,733 | Smith | May 5, 1959 |

FOREIGN PATENTS

| | | |
|---|---|---|
| 527,469 | Great Britain | Oct. 9, 1940 |